Patented Dec. 3, 1935

2,022,800

UNITED STATES PATENT OFFICE 2,022,800

TREATING WASTE ACID

Arthur B. Brown and David W. Bransky, Hammond, Ind., assignors to Standard Oil Company, Chicago, Ill., a corporation of Indiana No Drawing. Application June 30, 1932,
Serial No. 620,281

9 Claims. (Cl. 23—173)

This invention relates to the extraction of dispersed organic matter from aqueous solutions of such matter and specifically relates to the extraction of dispersed carbonaceous matter in the refinement of acids and acid sludges resulting from the treatment of cracked stocks such as refined oils and naphthas.

In the acid treatment the cracked stocks such as refined oils and naphthas are subjected to the action of sulfuric acid of preferably about 75% concentration (although higher acid concentrations may be employed such as 93% $H_2SO_4$) and produce an acid sludge which has a free acid content usually in the neighborhood of 50 to 60%. The acids used for the treating of refined oils and napththas will hereinafter be referred to as "weak" acids and they will range in concentration generally from about 75% to 93%. Efforts to reclaim used weak acid for further use have heretofore been unsuccessful or, at best, uneconomical because the acid sludge contains a large content of organic matter which cannot be satisfactorily separated by dilution with water in the usual manner. As a result, when the separated acid is concentrated by known methods, a large amount of carbon is found making it unsuitable for further acid treatment of refined oils and causing a large loss of $H_2SO_4$ in the concentrating process. It is also unsuitable for use as a pickling acid in the pickling of metals and consequently most of the acid has been disposed of in sewers as a total loss. Aside from the economic loss suffered by such sewer disposal there is the additional danger to fish and marine life attendant upon the dumping of the highly acidic material into bodies of water.

Our invention has for one of its objects the removal of the dispersed organic and carbonaceous matter whether in true or colloidal solutions or mixtures thereof from acids and acid sludges obtained from the treatment of cracked stocks such as refined oils and naphthas, in order that the acid content may be extracted and concentrated and the acid thereafter usefully employed in further refining operations. Another object is the purification of the acid and the removal of the organic content in order that the acid might be utilized as a pickling acid. Other objects will appear as this description proceeds.

In one of its broad aspects our invention contemplates the extraction of dispersed organic matter from aqueous solutions of such matter by means of the addition to the solution of a sulfonic acid or mixtures of sulfonic acids insoluble in the aqueous solution. An illustration of the principles of our invention may be obtained from the following example in which it is to be understood that the re-agents, concentrations and conditions are given by way of illustration and not by way of limitation:

A given quantity of the acid or acid sludge obtained by the treatment of cracked stocks such as a refined oil or naphtha is diluted with water and/or steam until there results an acid concentration of about 30% by weight. To this solution, before, after and during the dilution, is added an equal amount of oleum liver based on the $H_2SO_4$ content. The mixed stocks are thereupon agitated by steam or air blowing and are maintained at a temperature of about 200° F. for about two hours. The agitation is thereupon discontinued and the mixture is allowed to settle. Since the oleum liver is insoluble in the aqueous solution of sludge acid a separation into layers results and the treated sludge acid may be removed as the lower layer. This treated sludge acid (or R and N acid) will be found to have an acid concentration of about 30% by weight and is in suitable condition for subsequent treatment in a sulfuric acid concentrator of any desired type. The yield of $H_2SO_4$ obtained on concentrations to 85% willl be about 75% whereas without the treatment the yield is less than 40% even under the most carefully maintained conditions and even then an 85% concentrate is seldom obtained. Furthermore the carbon content will be found very much less than in the case of the untreated acid. When treated by our method the acid may also be satisfactorily used as a pickling agent, either before or after concentration, and will not deposit objectionable carbonaceous matter on the steel articles pickled. This is a distinct gain over the untreated sludge acid which in pickling baths foams to an extent which renders is unsuitable for commercial use.

As used in this specification, by "oleum liver" we mean the oil insoluble sulfonated products resulting from the treatment of lube fractions with concentrated or fuming sulfuric acid and in particular those products resulting from the fuming sulfuric acid treat in the manufacture of white oils. These products occur as an intermediate layer when the acid sludge is partially diluted with water to separate the dissolved oil from the acid. The sulfonic products collect as a middle layer and are separated from the oil layer above and the acid layer below. They may be purified by solution and reprecipitation or by extraction with various solvents such as alcohol.

We have found that the concentrating effect in the extraction of dispersed organic matter from R and N acids is possessed by "green acids". By "green acids" we mean the water soluble organic (sulfonic) acids resulting from the treatment of petroleum lubricating fractions with concentrated and fuming sulfuric acid, specifically fuming sulfuric acid. We have found that in general oleum liver contains in the neighborhood of 25% green acids in a form which may be separated as a component from the oleum liver. These green acids, while being soluble in water, are insoluble in aqueous sulfuric acid solutions containing 20% or more sulfuric acid. In our specification we have use the expression R and N acids to denote the acids left after the treatment of cracked stocks, such as refined oils and naphthas.

Due to the unsaturated nature of cracked distillates, the R and N acids resulting from their treatment have been found to possess a carbon ratio as high as 23 and sometimes considerably higher. The "carbon ratio" is the percent of carbon present in the impure acid or acid sludge, as determined by the wet combustion method, and is calculated with reference to the acid content of the sludge. Thus in an R and N acid where the analysis shows 8% carbon and 50% sulfuric acid, the carbon ratio would be 16. Our invention has been successful in the reduction of the carbon ratio of R and N acid from the undesirably high ratio of 23 or thereabouts to a carbon ratio below 1.5.

The benefits to be obtained by our process which result in the conversion of a hitherto waste product to one which may be successfully re-utilized both in the refining of petroleum products and in the pickling of metals, are readily apparent. Our invention is not to be construed as limited to the precise procedure set forth in the example above. Thus, while we have shown the dilution of the R and N sludge and the treatment with an equal amount of oleum liver, it is not to be understood that greater or less dilution and treatment with more or less oleum liver may not be employed. It will be apparent that green acids may be used in lieu of oleum liver and, in fact, any sulfonic acid or mixture of sulfonic acids may be employed, provided the sulfonic acid is not soluble in the solution to be treated.

As many apparently widely different employments of this invention may be made without departing from the spirit thereof, it is to be understood that we do not limit ourselves to the foregoing example or description, except as indicated in the following patent claims.

We claim:

1. The process of reducing the carbon content of the acid sludge obtained by treating cracked refined oils and naphthas with 75% to 93% sulfuric acid which comprises adding oleum liver to the sludge and diluting the mixture with water until an acid concentration of about 30% is obtained, heating the mixture to about 200° F. and agitating the mixture at about that temperature, settling, withdrawing the acid layer and concentrating the acid thus obtained.

2. The process of reducing the carbon content of the acid sludge obtained by treating cracked refined oils and naphthas with 75% to 93% sulfuric acid which comprises adding oleum liver to the sludge and diluting the mixture with water until an acid concentration of about 30% is obtained, heating the mixture to about 200° F. and agitating the mixture at about that temperature, settling and withdrawing the acid layer.

3. The process of reducing the carbon content of the acid sludge obtained by treating cracked refined oils and naphthas with weak sulfuric acid, which comprises adding oleum liver to the sludge and diluting the mixture with water until the mixture has an acid concentration above 20%, heating the mixture with agitation, settling and withdrawing the acid layer.

4. In the process of reducing the carbon content of the acid sludge obtained by treating cracked refined oils and naphthas with weak sulfuric acid, the steps which comprise adding oleum liver to the sludge, maintaining the sludge at an acid concentration such that the oleum liver is insoluble in the solution of sulfuric acid, and separating said sulfuric acid solution from the material insoluble therein.

5. The process of purifying the acid content of acid sludge obtained by the treatment of cracked refined oils and naphthas with weak sulfuric acid which comprises adding to the acid sludge a green acid obtained from the treatment of a lubricating oil stock with strong sulfuric acid, adding sufficient water to cause the separation of a clean sulfuric acid phase from a green acid phase in which carbonaceous materials are concentrated and removing said clean sulfuric acid from the green acid and impurities.

6. The process of reducing the carbon content of the acid sludge obtained by treating cracked refined oils and naphthas with 75% to 93% sulfuric acid which comprises adding green acid to the sludge and diluting the mixture with water until an acid concentration of about 30% is obtained, heating the mixture to about 200° F., agitating at about that temperature, settling, withdrawing the acid layer and concentrating the acid thus obtained.

7. The process of reducing the carbon content of the acid sludge obtained by treating cracked refined oils and naphthas with 75% to 93% sulfuric acid which comprises adding to the sludge a green acid obtained from the treatment of lubricating oil stock with strong sulfuric acid and diluting the mixture with water until an acid concentration of about 30% is obtained, heating the mixture to about 200° F. and agitating the mixture at about that temperature, settling and withdrawing the acid layer.

8. The process of reducing the carbon content of the acid sludge obtained by treating cracked refined oils and naphthas with weak sulfuric acid which comprises adding green acid to the sludge and diluting the mixture with water until the mixture has an acid concentration above 20%, heating the mixture with agitation, settling and withdrawing the acid layer.

9. In the process of reducing the carbon content of the acid sludge obtained by treating cracked refined oils and naphthas with weak sulfuric acid, the step which comprises adding to the sludge a green acid obtained from the treatment of lubricating oil stock with strong sulfuric acid and maintaining the sludge at a sulfuric acid concentration such that the green acid is insoluble in the solution, intimately admixing said green acid with the sulfuric acid solution for separating carbonaceous impurities therefrom, separating the mixture into a sulfuric acid phase and a green acid phase, and removing one phase from the other.

ARTHUR B. BROWN.
DAVID W. BRANSKY.